(12) United States Patent
Pirie et al.

(10) Patent No.: US 9,599,167 B2
(45) Date of Patent: Mar. 21, 2017

(54) METHOD FOR DISSIPATING HEAT IN DRIVE SYSTEM FOR AN APPARATUS SEPARATING HOT PARTICLES

(71) Applicant: Outotec (Finland) Oy, Espoo (FI)

(72) Inventors: Michael Pirie, Jessup, MD (US); Javier Castro, Jessup, MD (US)

(73) Assignee: OUTOTEC (FINLAND) OY, Espoo (FI)

( * ) Notice: Subject to any disclaimer, the term of this patent is extended or adjusted under 35 U.S.C. 154(b) by 16 days.

(21) Appl. No.: 14/489,995

(22) Filed: Sep. 18, 2014

(65) Prior Publication Data

US 2016/0084320 A1 Mar. 24, 2016

(51) Int. Cl.
*F16D 3/72* (2006.01)
*B03C 1/031* (2006.01)
*B03C 1/14* (2006.01)

(52) U.S. Cl.
CPC ............... *F16D 3/72* (2013.01); *B03C 1/031* (2013.01); *B03C 1/14* (2013.01); *F16D 2300/0212* (2013.01); *Y10T 464/10* (2015.01)

(58) Field of Classification Search
CPC ... F16D 3/72; F16D 2300/0212; B03C 1/031; B03C 1/14; Y10T 464/10
USPC ..... 464/17, 79, 88; 403/28; 198/952; 241/23
See application file for complete search history.

(56) References Cited

U.S. PATENT DOCUMENTS

| 1,582,284 | A | * | 4/1926 | Leipert | F16D 3/74 464/17 |
| 3,193,068 | A | * | 7/1965 | Greve | F16D 9/02 464/17 X |
| 5,364,309 | A | * | 11/1994 | Heidrich | F16D 3/72 |
| 6,095,924 | A | * | 8/2000 | Geislinger | F16D 3/72 464/88 X |
| 7,478,727 | B2 | | 1/2009 | Grey et al. | |

OTHER PUBLICATIONS

Sherman, Lilli Manolis. "Plastics That Conduct Heat" Plastics Technology, [online] Jun. 2001, [retrieved on Oct. 14, 2016]. Retrieved from the Internet:<http;//ptonline.com/articles/plastics-that-conduct-heat>.*

* cited by examiner

Primary Examiner — Gregory Binda
(74) Attorney, Agent, or Firm — Buchanan, Ingersoll & Rooney PC

(57) ABSTRACT

A drive system for an apparatus separating hot particles being received by a moving surface includes a drive shaft for driving the moving surface receiving the hot particles, a drive unit for rotating the drive shaft, and a flexible coupling arranged between the drive shaft and the drive unit. The flexible coupling includes thin portions defining a portion of a heat transfer path from the drive shaft to the drive unit. The thin portions have large surface area to volume ratios for extending the heat transfer path. The thin portions dissipate heat when the flexible coupling is driven by the drive unit. A method for dissipating heat from a drive system for an apparatus for separating hot particles includes providing a flexible coupling and dissipating heat from the flexible coupling.

7 Claims, 1 Drawing Sheet

METHOD FOR DISSIPATING HEAT IN DRIVE SYSTEM FOR AN APPARATUS SEPARATING HOT PARTICLES

TECHNOLOGICAL FIELD

The present invention relates generally to a drive system, and particularly to a drive system for an apparatus for separating hot particles. The present application also relates generally to a method of dissipating heat from a drive system for an apparatus for separating hot particles.

BACKGROUND DISCUSSION

There is a significant need to magnetically separate materials at as high a temperature as feasible. Typically, in a hot magnetic separation process the materials are coming from a hot process. Once separated, the magnetic fraction and the non-magnetic fraction of the materials are returned to a hot process. There is therefore a need to maintain the material stream at an elevated temperature so that the materials are not cooled and subsequently reheated after processing.

A hot magnetic separator apparatus is disclosed in U.S. Pat. No. 7,478,727, the entire content of which is incorporated by reference herein. In the hot magnetic separator apparatus of U.S. Pat. No. 7,478,727, a variable frequency drive rotates the drum, and a control and instrumentation package controls the variable frequency drive. Conventional magnetic separator apparatuses that operate at elevated temperatures transfer heat from the hot magnetic separation process to the drive system, which may cause the drive system to exceed its maximum design temperature. Conventional magnetic separator apparatuses with drive systems also do not correct any misalignment between a drive shaft and the drive unit.

A need exists for a more efficient, cost-effective configuration for a drive system for an apparatus separating hot particles so that these and other concerns may be addressed.

SUMMARY

The disclosure here involves a drive system for an apparatus for separating hot particles. The drive system includes a drive shaft arranged to drive the moving surface receiving the hot particles, a drive unit arranged to rotate the drive shaft, and a flexible coupling arranged between the drive shaft and the drive unit. The flexible coupling is configured to align the drive shaft and the drive unit and comprises thin portions that define a portion of a heat transfer path from the drive shaft to the drive unit. The thin portions have large surface area to volume ratios for extending the portion of the heat transfer path between the drive shaft and the drive unit. The thin portions dissipate heat when the flexible coupling is connected to the drive unit.

The disclosure here also involves a method for dissipating heat from a drive system for an apparatus for separating hot particles where the drive system includes a drive shaft arranged to drive a moving surface receiving hot particles and a drive unit arranged to rotate the drive shaft. The method comprises providing a flexible coupling arranged between the drive shaft and the drive unit. The flexible coupling aligns the drive shaft and the drive unit. The flexible coupling comprises thin portions defining a portion of a heat transfer path from the drive shaft to the drive unit. The thin portions have large surface area to volume ratios for extending the heat transfer path between the drive shaft and the drive unit. The method also comprises dissipating heat from the thin portions of the flexible coupling when the flexible coupling is connected to the drive unit.

BRIEF DESCRIPTION OF THE DRAWING FIGURES

Additional features and aspects of the drive system for separating hot particles being received by a moving surface and a method of dissipating heat from a drive system for an apparatus for separating hot particles disclosed here will become more apparent from the following detailed description considered with reference to the accompanying drawing figures in which like elements are designated by like reference numerals.

DETAILED DESCRIPTION

The drive system disclosed in this application allows for the dissipation of heat so that the drive system operates well below the maximum design temperature for the drive system. The drive system disclosed here also corrects any shaft misalignment that may arise between the components of the drive system.

The drive system disclosed here is particularly suitable for use with magnetic drum separators including Hot Magnetic Separator (HMS) Systems. The design temperature for HMS systems is typically about 800 degrees Celsius. A significant economic benefit is achieved by separating the materials at a high temperature. The materials are typically obtained from a hot process. Once separated, the magnetic fraction and the non-magnetic fraction are often returned to a hot process. It is therefore beneficial to maintain the material streams at an elevated temperature during the magnetic separation process so that the material streams do not have to be cooled and then reheated. The energy savings are significant and translate to lower operating costs. Capital costs are also reduced because there is less of a need for the purchase and installation of cooling and reheating equipment.

Known drive systems, however, have a maximum design temperature. In conventional magnetic drum separators, the HMS system would tend to heat the drive shaft that rotates the drum. If a conventional magnetic separator were used for hot material, the heat would be transferred to the drive system and cause the drive system to approach its maximum design temperature. Known drive systems have attempted to address this by extending the shafts, using different materials for the shaft, and using insulating spacers that are bolted in a fixed location in the system. Other known drive systems have directly cooled shafts using cooled water or air. These methods introduce specialized materials or additional components to the drive system which increases the manufacturing costs. These methods also do not correct any shaft misalignment that may occur in the drive system.

To address this concern and to ensure shaft alignment, the drive system at issue here includes, in combination with other features, a flexible coupling as will be described below.

Figure 1:
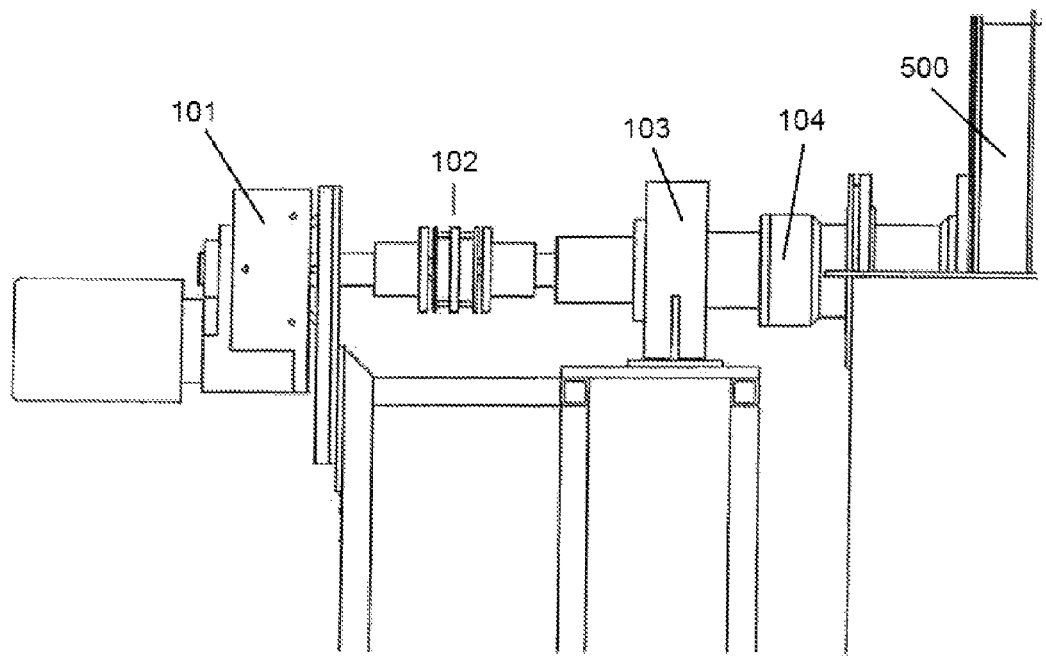
FIG. 1 is a view of a drive system with an apparatus for separating hot particles.

An embodiment of an apparatus for separating hot particles being received by a moving surface is shown in FIG. 1. The apparatus includes a moving surface 500 for receiving the hot particles. The moving surface 500 is rotated by the drive system. The drive system includes a drive unit 101, a flexible coupling 102, a drive side bearing assembly 103, and a drive shaft 104. The drive unit 104 can be a fixed speed drive unit, but in alternative embodiment, the drive unit 104 is a variable speed drive unit In the embodiment, the drive unit 101 drives a driven shaft which then rotates the flexible coupling 102. The flexible coupling 102 transfers this rotation to the drive shaft 104. The movable surface 500 is rotated by the drive shaft 104. Thus, when the drive unit 101 of the drive system generates rotation, the rotation is transferred to the movable surface 500. In the embodiment shown in FIG. 1, the drive shaft 104 is supported by a drive side bearing assembly 103 which supports the drive shaft 104. In another embodiment, the drive system may include a gearbox and other components including drive belts and pulleys. Other components may be included in the drive system and are not specifically enumerated here.

The flexible coupling 102 may be configured to engage with the drive shaft 104 and the driven shaft by friction, bolts, keyway, or other similar methods. The engagement of the flexible coupling 102 to the drive shaft 104 and the driven shaft is sufficient so that the flexible coupling 102 is rotated by the rotation of the driven shaft of the drive unit 101. The rotation of the flexible coupling 102 then rotates the movable surface 500.

Figure 2:
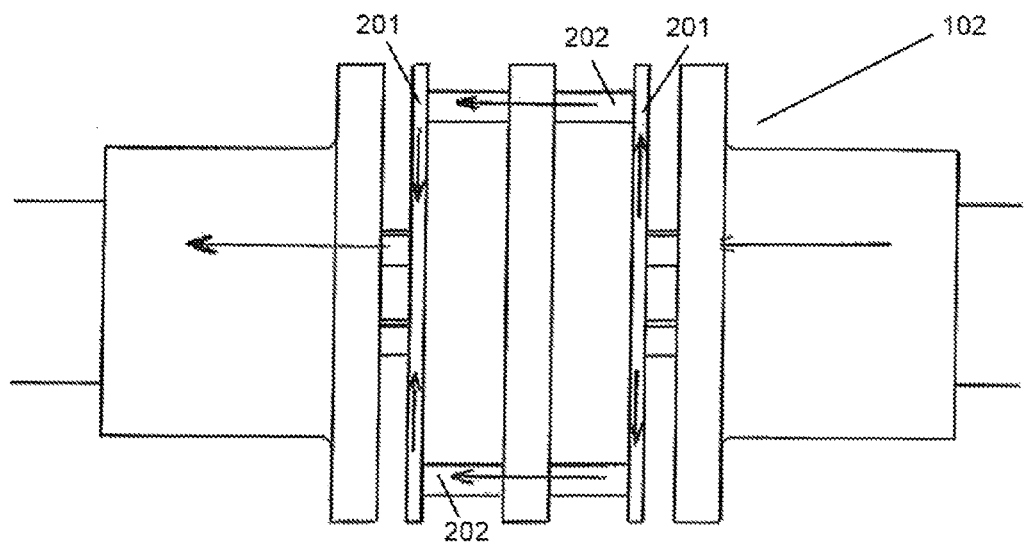
FIG. 2 is a view of the flexible coupling used in the drive system disclosed here.

An embodiment of the flexible coupling 102 is shown in detail in FIG. 2. The flexible coupling 102 includes thin portions 201, 202 that define at least a portion of a heat transfer path from the drive shaft 104 to the drive unit 101. The thin portions 201, 202 lengthen the heat transfer path between the drive shaft 104 and the driven shaft of the drive unit 101. The thin portions 201, 202 are formed to have a large surface to volume ratio to extend the heat transfer path and also to dissipate heat more effectively. In one embodiment, the thin portions 201, 202 are particularly effective at dissipating heat by convection when the drive system is operating. In particular, the rotation of the flexible coupling 102 increases dissipation of heat from the drive shaft 104.

The flexible coupling 102 remains torsionally strong while accommodating for shaft misalignment. In some embodiments, the flexible coupling 102 may be a double disc style coupling comprising two hubs, two flexible members, and a center spacer sandwiching the two flexible members. In other embodiments, the flexible coupling 102 may be a single disc style coupling comprising two hubs and one flexible member. In both styles of couplings, the flexible members are fastened to the hubs so that the flexible members are fixed relative to the hubs. The flexible members bend relatively easily so that misalignment may be accommodated by the flexible coupling 102.

The flexible coupling 102 shown in FIG. 2 comprises two substantially parallel thin portions 201 that are arranged orthogonal to the longitudinal axis of the drive shaft 104 and the driven shaft of the drive unit 101. In one embodiment, the thin portions 201 comprise flexible members. The depicted flexible coupling 102 also includes two substantially parallel thin portions 202 that are arranged parallel to the longitudinal axis of the drive shaft 104 and the driven shaft of the drive unit 101. In one embodiment, the thin portions 202 are fasteners that secure the flexible members to the hub. In another embodiment, if the flexible coupling 102 is a double disc style coupling, the thin portions 202 also secure the flexible members to the center spacer. This arrangement of the thin portions 201, 202 forms a portion of the heat transfer path from the drive shaft 104 to the drive unit 101. The depicted arrangement is merely one possible example arrangement of thin portions 201, 202 in the flexible coupling 102. The arrows included in FIG. 2 illustrate one possible heat transfer path formed by the thin portions 201, 202 which extend the heat transfer path from the drive shaft 104 to the drive unit 101.

The thin portions 201, 202 may be made of metal or another suitable heat conductive material, or plastic or another suitable heat insulating material. The thin portions 201, 202 may also include features to facilitate dissipation of heat. The features may increase the surface area to volume ratio of the thin portions 201, 202 to further extend the heat transfer path and to also improve heat dissipation characteristics. In some embodiments, the features may be surface features such as slots, slits, holes, or dimples. In some embodiments, a combination of these features may be used to improve heat dissipation characteristics.

In addition to lengthening or extending the heat transfer path and dissipating heat from the drive shaft 104 so that the heat load of the drive system does not exceed the maximum design temperature, the flexible coupling 102 also corrects misalignment between the drive shaft 104 and the driven shaft so that the movable surface 500 and the drive unit 101 operate smoothly.

A technique for dissipating heat in a drive system for use with a magnetic drum separator is also disclosed here. The technique includes providing a flexible coupling between the drive shaft and the drive unit so that thin portions with large surface area to volume ratios extend the heat transfer path between the drive shaft and the drive unit. The heat is dissipated from the thin portions of the flexible coupling when the flexible coupling is connected to the drive unit. As discussed above, the incorporation of the disclosed flexible coupling helps prevent the drive system from exceeding its maximum design temperature while still allowing the apparatus for separating hot particles to operate at a high temperature.

The detailed description above describes features and aspects of embodiments of a drive system for an apparatus separating hot particles and are disclosed by way of example. The invention is not limited, however, to the precise embodiments and variations described. Changes, modifications, and equivalents can be employed by one skilled in the art without departing from the spirit and scope of the invention as defined in the appended claims. It is expressly intended that all such changes, modifications, and equivalents which fall within the scope of the claims are embraced by the claims.

What is claimed is:

1. A method of separating heated particles and dissipating heat from a drive system for an apparatus for separating the heated particles, the method comprising:
  providing a drive shaft which drives a moving surface, said moving surface arranged to receive heated particles supplied thereto;
  providing a drive unit which rotates the drive shaft;
  providing a flexible coupling arranged between the drive shaft and the drive unit, said flexible coupling configured to align the drive shaft and the drive unit, said flexible coupling comprising flexible members defining a portion of a heat transfer path from the drive shaft to the drive unit, the flexible members extending the heat transfer path between the drive shaft and the drive unit;
  dissipating heat from the flexible members of said flexible coupling when said flexible coupling is connected to the drive unit; and
  separating heated particles,
  wherein the flexible members are made of a heat conductive material.

2. The method defined in claim 1, wherein the drive system further comprises a drive side bearing assembly arranged to support the drive shaft, said flexible coupling being arranged between the drive side bearing assembly and the drive unit.

3. The method defined in claim 1, wherein at least one of the flexible members of said flexible coupling is arranged substantially orthogonally to a longitudinal axis of the drive shaft.

4. The method defined in claim 1, wherein at least two of the portions of said flexible coupling are arranged substantially orthogonally to a longitudinal axis of the drive shaft, the flexible members being arranged on opposite sides of said flexible coupling.

5. The method as defined in claim 1, wherein the drive unit is a fixed speed drive unit.

6. The method as defined in claim 1, wherein the drive unit is a variable speed drive unit.

7. The method as defined in claim 1, wherein the flexible members are made of metal.

\* \* \* \* \*